(12) United States Patent
Bohn et al.

(10) Patent No.: US 6,538,243 B1
(45) Date of Patent: Mar. 25, 2003

(54) CONTACT IMAGE SENSOR WITH LIGHT GUIDE HAVING LEAST REFLECTIVITY NEAR A LIGHT SOURCE

(75) Inventors: David D Bohn, Ft Collins, CO (US); Eugene A Miksch, Loveland, CO (US); Ruth Ann Davies, Fort Collins, CO (US); Keith M Mahoney, Windsor, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/477,205

(22) Filed: Jan. 4, 2000

(51) Int. Cl.[7] ............................................. H01L 27/00
(52) U.S. Cl. .................... 250/208.1; 250/216; 250/234; 250/239; 385/146; 358/482; 358/474; 358/483; 358/484
(58) Field of Search ............................. 250/208.1, 216, 250/239, 234, 235; 358/482, 475, 474, 483, 484; 385/146

(56) References Cited

U.S. PATENT DOCUMENTS

| 5,434,682 | A | * | 7/1995 | Imamura et al. ............. 358/474 |
| 5,552,597 | A | | 9/1996 | McConica .................... 250/234 |
| 5,578,813 | A | | 11/1996 | Allen et al. ............... 250/208.1 |
| 5,586,212 | A | | 12/1996 | McConica et al. .......... 385/146 |
| 5,644,139 | A | | 7/1997 | Allen et al. ................. 250/557 |
| 5,945,664 | A | * | 8/1999 | Ogura ....................... 250/208.1 |
| 6,014,231 | A | * | 1/2000 | Sawase et al. .............. 358/482 |
| 6,054,707 | A | * | 4/2000 | Hou ............................ 250/234 |
| 6,172,356 | B1 | * | 1/2001 | Ogura et al. ............ 250/227.11 |
| 6,259,108 | B1 | * | 7/2001 | Antonelli et al. ............ 250/556 |
| 6,326,602 | B1 | * | 12/2001 | Tabata ...................... 250/208.1 |

* cited by examiner

Primary Examiner—Que T. Le
Assistant Examiner—Christopher W. Glass

(57) ABSTRACT

A contact image sensor includes a light sensitive optical detector and a light source mounted on a mounting surface. A light guide is located under the light source and is oriented to direct a light path from the light source to a scan line region under the light sensitive optical detector.

19 Claims, 5 Drawing Sheets

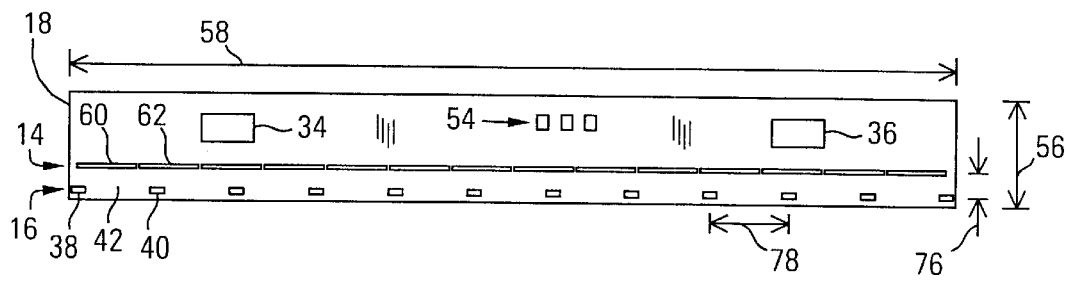
FIG. 3
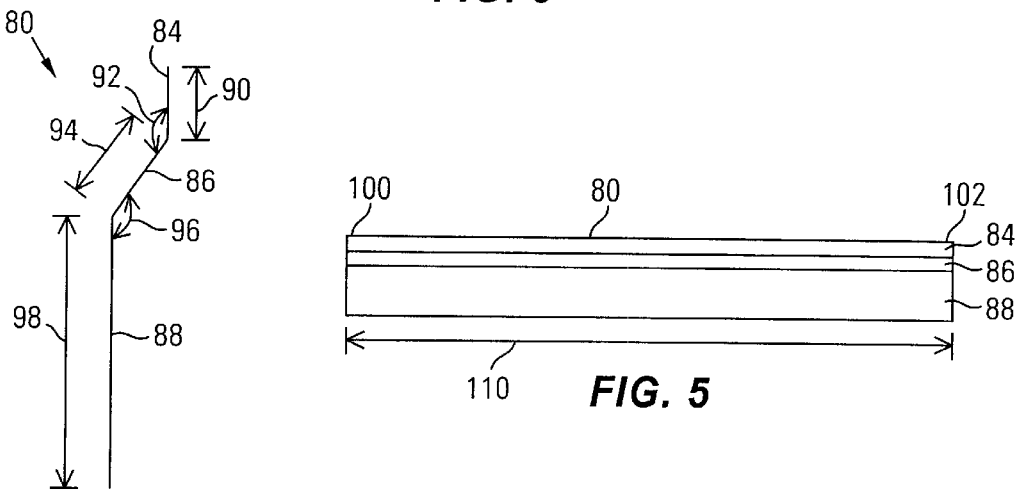
FIG. 4
FIG. 5
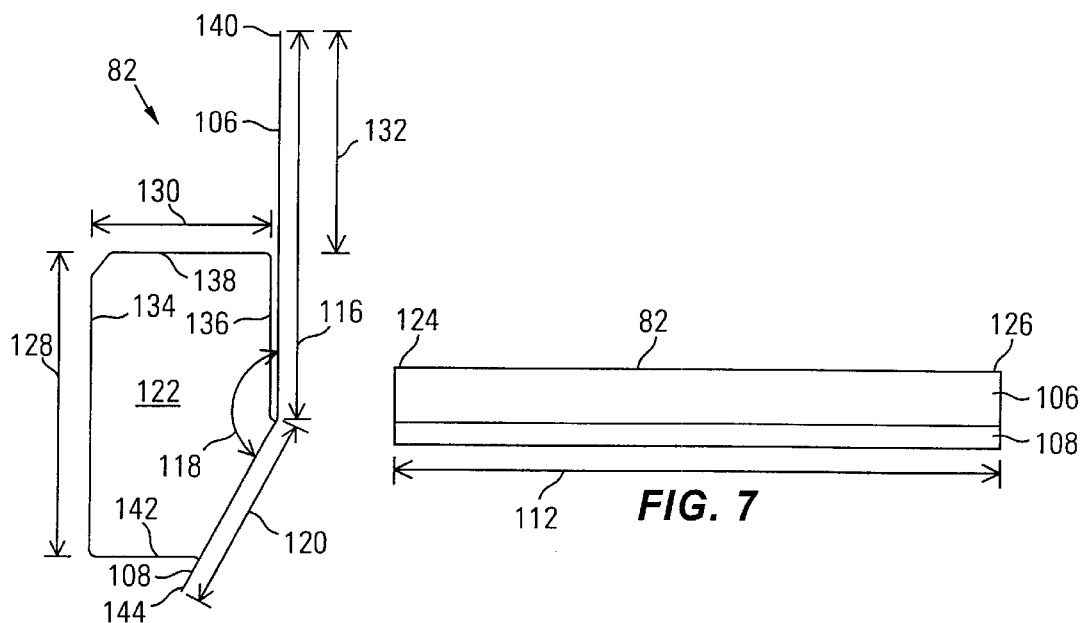
FIG. 6
FIG. 7

CONTACT IMAGE SENSOR WITH LIGHT GUIDE HAVING LEAST REFLECTIVITY NEAR A LIGHT SOURCE

FIELD OF THE INVENTION

This invention relates to contact image sensors in general and more specifically to a contact image sensor assembly having optical detectors and light emitting diodes mounted on a single circuit board with a light guide positioned under the light emitting diodes.

BACKGROUND

Contact image sensors are electronic optical detectors commonly used in devices such as computer scanners, fax machines, and digital copiers. A contact image sensor is an optical sensor assembly which is placed on or near an object during a scanning operation. The contact image sensor produces machine-readable image data signals that are representative of the scanned object, such as a photograph or a page of printed text. In a typical contact image sensor application, the image data signals produced by the sensor may be used by a computer processor to reproduce an image of the scanned object on a suitable display device, such as a CRT or a printer.

A typical contact image sensor may include an elongate optical assembly comprising illumination, optical imaging, and detection systems. The illumination source illuminates a portion of the object (commonly referred to as a "scan region"), whereas the optical imaging system collects light reflected by the illuminated scan region and focuses a small area of the illuminated scan region (commonly referred to as a "scan line") onto the surface of a photosensitive detector positioned within the contact image sensor. The photosensitive detector converts the image light incident thereon into electrical signals representative of the scan line. Image data representative of the entire object then may be obtained by sweeping the scan line across the entire object.

The term "image light" as used herein refers to the light reflected from the document and focused onto the surface of the detector array by the optical system. The image light may be converted into digital signals in essentially three steps. First, the photosensitive optical detector converts the light it receives into a varying electric current. Second, the varying electric currents from the detector elements are converted into analog voltages by an analog amplifier. Finally, the analog voltages are digitized by an analog-to-digital (A/D) converter. The digital data then may be processed and/or stored as desired.

While contact image sensors of the type described above are being used in many applications, they are not without their problems, such as bulky illumination sources and uneven illumination across the scan line. For best scanning results, the object must be illuminated by the illumination source at an angle to reduce or eliminate specular reflections. To do this, the photosensitive detector is typically mounted on one circuit board, and the illumination source is placed on another circuit board. The circuit board with the illumination source is then angled at about a 45 degree angle with respect to the object. This additional circuit board increases size, cost, and difficulty of assembly of the contact image sensor. This also results in poor depth of illumination. For example, if the contact image sensor is moved even a small distance from the object, the illumination level drops off rapidly. Even if the optical system depth of field is good and the object remains in focus as the contact image sensor is lifted, the poor depth of illumination will cause the image of the object to appear too dark or too unevenly illuminated.

In addition, the illumination source typically consists of a linear array of light emitting diodes (LEDs), with gaps between each LED. The illumination across the scan line is therefore not very uniform, having bright areas under the LEDs and dimmer areas under the gaps. This lack of uniformity of illumination can be compensated for somewhat by amplifying the signal from the dimmer areas, either in the detection system hardware or with software. However, this slows the image processing software and increases the noise in the amplified signal, resulting in poorer image quality.

The LEDs in the illumination source are typically designed to radiate light over a very wide angle, such as 180 degrees. Only a portion of this light is directed at the scan line, resulting in an inefficient use of the illumination from the LEDs.

Finally, placing the illumination source on a separate circuit board increases the width of the contact image sensor and gives a poor cosmetic appearance to an otherwise high tech product.

Consequently, a need exists for a contact image sensor with more integrated packaging of the illumination source and detection system, resulting in a more compact unit which is simpler to assemble and align. A further need exists for a contact image sensor having improved depth of illumination. A further need exists for a contact image sensor which produces more uniform illumination across a scan line. A further need exists for a contact image sensor which efficiently uses the illumination from the illumination source.

SUMMARY

To assist in achieving the aforementioned needs, the inventors have devised a contact imaging sensor with a light guide. The light guide collects the light from a light source and directs it onto a scan line region. The light guide also increases the uniformity of illumination across the scan line region and increases the depth of illumination.

The invention may comprise a contact image sensor which includes a light sensitive optical detector and a light source mounted on a mounting surface. A light guide is located under the light source and is oriented to direct a light path from the light source to a scan line region under the light sensitive optical detector.

The invention may also comprise a method of producing a contact image sensor. The method comprises mounting a light sensitive optical detector on a mounting surface and mounting at least one light source adjacent the light sensitive optical detector on the mounting surface. The method further comprises positioning a light guide under the at least one light source to direct a light path from the at least one light source to a region under the light sensitive optical detector.

The invention may also comprise a contact image sensor having a printed circuit board with a plurality of photodetectors and a plurality of light sources mounted to the printed circuit board. The contact image sensor also comprises means for directing light from the plurality of light sources to a region under the plurality of photodetectors.

BRIEF DESCRIPTION OF THE DRAWING

Illustrative and presently preferred embodiments of the invention are shown in the accompanying drawing, in which:

FIG. 3 is a view of the face of the printed circuit board in the contact image sensor of FIG. 1, showing the placement of the photodetector and LEDs;

FIG. 4 is a left side view of the inner panel of the light guide of FIG. 1;

FIG. 5 is a front view of the inner panel of the light guide of FIG. 1;

FIG. 6 is a left side view of the outer panel of the light guide of FIG. 1;

FIG. 7 is a front view of the outer panel of the light guide of FIG. 1;

DESCRIPTION OF THE PREFERRED EMBODIMENT

Figure 1:
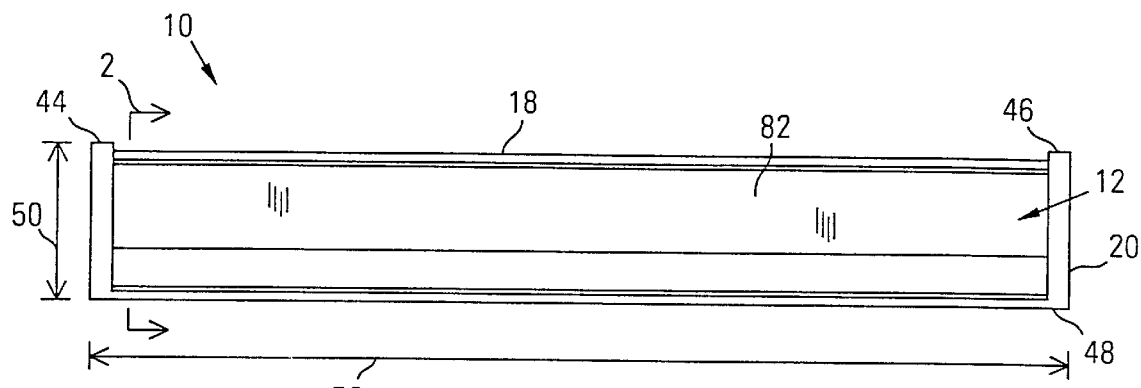
FIG. 1 is a front view of a contact image sensor with a light guide.

The drawing and description, in general, disclose a contact image sensor 10 which includes a light sensitive optical detector 14 and a light source 16 mounted on a mounting surface 18. A light guide 12 is located under the light source 16 and is oriented to direct a light path 26 from the light source 16 to a scan line region 28 under the light sensitive optical detector 14.

The drawing and description also disclose a method of producing a contact image sensor 10. The method comprises mounting a light sensitive optical detector 14 on a mounting surface 18 and mounting at least one light source (e.g., 38 and 40) adjacent the light sensitive optical detector 14 on the mounting surface 18. The method further comprises positioning a light guide 12 under the at least one light source (e.g., 38 and 40) to direct a light path 26 from the at least one light source (e.g., 38 and 40) to a region 28 under the light sensitive optical detector 14.

The drawing and description also disclose a contact image sensor 10 having a printed circuit board 18 with a plurality of photodetectors (e.g., 60 and 62) and a plurality of light sources (e.g., 38 and 40) mounted to the printed circuit board 18. The contact image sensor 10 also comprises means 12 for directing light from the plurality of light sources (e.g., 38 and 40) to a region 28 under the plurality of photodetectors (e.g., 60 and 62).

Figure 2:
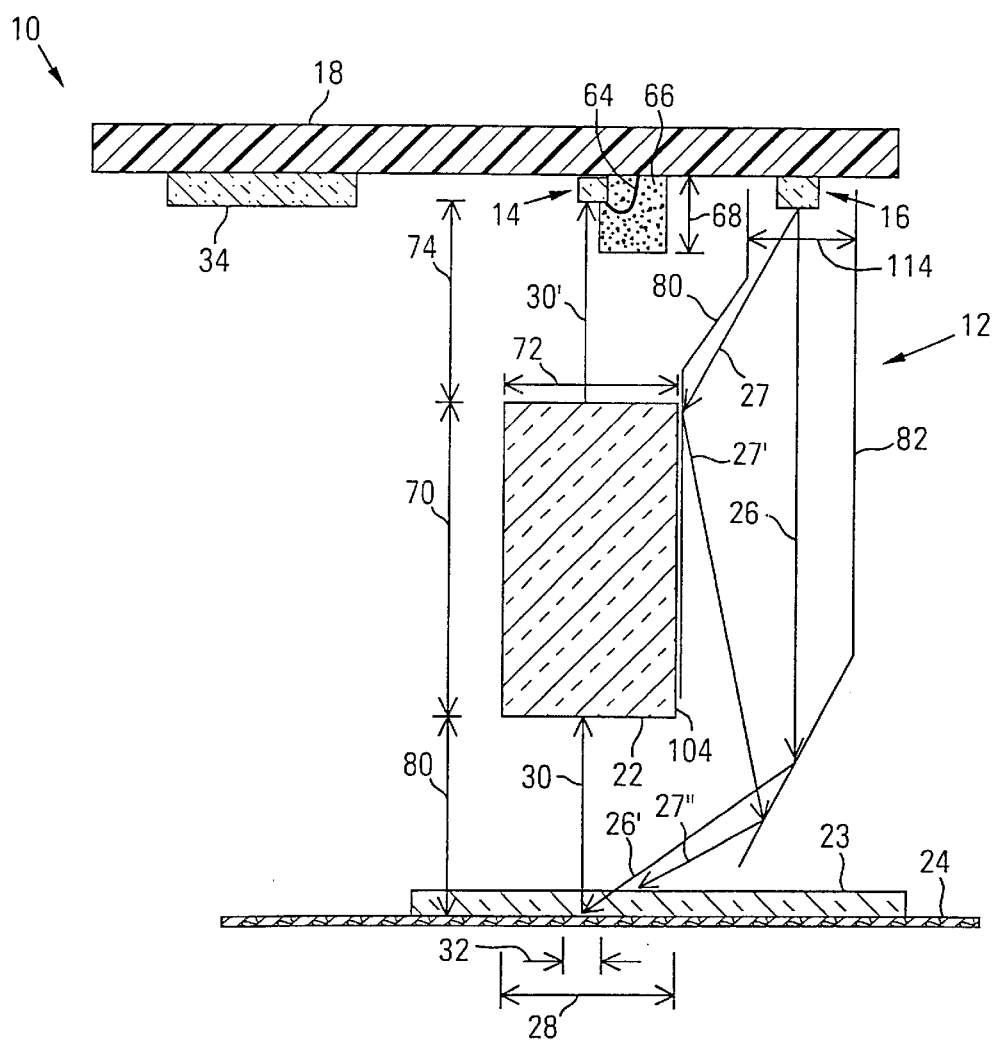
FIG. 2 is a cross-sectional side view of the contact image sensor of FIG. 1 taken along line 2 with the housing removed.

A contact image sensor 10 with a light guide 12 may be used in an imaging device such as a scanner or fax machine to capture the image of an object 24 such as a document having printed text or graphics. The contact image sensor 10 with a light guide 12 is illustrated in FIGS. 1–3. The contact image sensor 10 with a light guide 12 comprises an optical detector 14 and an illumination source 16 mounted on a mounting surface, such as a printed circuit board 18. The printed circuit board 18 is preferably mounted to a housing 20 which provides a compact structure for the contact image sensor 10. A lens 22 is mounted to the housing 20 under the optical detector 14 to direct and focus image light reflected from an object 24 onto the optical detector 14. The light guide 12 is mounted to the lens 22 and the housing 20 under the illumination source 16. The light guide 12 directs light from the illumination source 16 along a light path (e.g., 26 and 26') onto a scan region 28 on the object 24. Image light is reflected from a scan line 32 in the illuminated scan region 28 on the object 24. The image light travels along an image light path 30 and 30' through the lens 22 to the optical detector 14. The image light is converted by the optical detector 14 into image data representative of the light and dark patterns on the object 24.

If the contact image sensor 10 is not as wide as the object 24 to be scanned, the contact image sensor 10 is swept over the object 24 in a curvilinear or meandering fashion during a scanning operation. This sweeping action produces connected image strips or swaths which must then be stitched together by a stitching algorithm to produce a complete image of the object 24.

In the preferred embodiment, a pair of position detectors or navigators 34 and 36 are located on the printed circuit board 18 to detect and track movement of the contact image sensor 10 over the object 24. The navigators 34 and 36 provide position information which is paired with the swaths of image data provided by the optical detector 14. The stitching algorithm can then use the position information to create a complete image of the object 24 from the scanned image swaths. Exemplary navigation systems and stitching algorithms are disclosed in U.S. Pat. No. 5,644,139 of Allen, et al., for "Navigation Technique for Detecting Movement of Navigation Sensors Relative to an Object" and U.S. Pat. No. 5,578,813 of Allen, et al., for "Freehand Image Scanning Device which Compensates for Non-Linear Movement," both of which are specifically incorporated herein by reference for all that they disclose. However, since the details of the stitching algorithm that may be used in such a contact image sensor 10 with a light guide 12 are not necessary to understand or practice the present invention, the particular stitching algorithm that may be utilized will not be described in further detail herein.

The contact image sensor 10 with a light guide 12 provides substantial benefits, including increased uniformity of illumination across the scan line 32. In a preferred embodiment, the illumination source 16 comprises an array of light emitting diodes (LEDs) (e.g., 38 and 40) which are spaced across the printed circuit board 18 with gaps (e.g., 42) between them. The light guide 12 spreads the light from the LEDs (e.g., 38 and 40) across the scan line 32 much more uniformly, reducing the spot-light effect from the individual LEDs.

The contact image sensor 10 with a light guide 12 also uses the light from the illumination source 16 efficiently. The LEDs (e.g., 38 and 40) typically radiate light over a very wide range of directions, most of which are not aimed at the scan line 32. The light guide 12 redirects this light toward the scan line 32. Correspondingly, the light guide 12 reduces stray light inside the contact image sensor 10. If stray light from the illumination source 16 reaches the optical detector 14, the image data is degraded and the final image quality is reduced. The light guide 12 aids in preventing stray light from reaching the optical detector 14.

The contact image sensor 10 with a light guide 12 also provides improved depth of illumination of the scan region 28 on the object 24. Without the light guide 12, a contact image sensor must typically be placed in very close contact with the object 24. Light is radiated from the illumination source over a full hemisphere, so only a small portion of the light is directed toward the scan region 28, and the light flux per unit angle is relatively low. If the contact image sensor without a light guide 12 is tilted or moved slightly away from the object 24, the illumination level on the scan region 28 falls rapidly, resulting in an undesirably dark image or a very non-uniform image. The light guide 12, however, directs the light from the illumination source 16 onto the scan region 28 so that even if the contact image sensor 10 is tilted or moved slightly away from the object 24, the image does not darken as rapidly. Since the light is more focused and directed toward the scan region 28, the flux per unit angle is greater and the intensity does not drop off as quickly with an increase n distance from the illumination source. The light guide 12 also reduces the non-uniform spot-light effect which increases with distance as a contact image sensor without a light guide is moved away from the object 24.

The contact image sensor 10 with a light guide 12 is also more compact and cheaper than previous contact image sensors. Without a light guide 12, the illumination source 16 is typically mounted on a separate circuit board and positioned close to the scan region 28 at an angle. The light guide 12 removes the need for an additional circuit board, with its attendant wires, electrical interconnect and mounting hardware. The contact image sensor 10 with a light guide 12 is thus simpler to assemble, costs less, and is less prone to failure. The contact image sensor 10 with a light guide 12 allows a smaller and lighter scanner, fax machine, or other imaging device.

Having briefly described the contact image sensor 10 with a light guide 12 as well as some of its more significant features and advantages, the various embodiments of the contact image sensor 10 with a light guide 12 will now be described in detail. However, before proceeding with the detailed description it should be noted that the contact image sensor 10 with a light guide 12 is not limited to use with any particular type or style of scanner device.

In a preferred embodiment, a contact image sensor 10 with a light guide 12 comprises a U-shaped housing 20 having a substantially planar left side 44 and right side 46, connected in spaced-apart parallel relation by a bottom or contact surface 48. The housing 20 also has a rear portion (not shown), extending between the sides 44 and 46 and rising from the contact surface 48. The contact surface 48 is preferably planar and contains openings or windows (e.g., 23) allowing illumination and image light to pass in and out of the contact image sensor 10 to the scan region 28 on the object 24. The contact surface 48 also contains openings allowing the navigators 34 and 36 to scan portions of the object 24. The housing 20 has a height 50 of about 10.3 mm which is tall enough to contain the required elements (e.g., 14, 16, 12, and 22) of the contact image sensor 10. The housing 20 has a length 52 of about 128.0 mm which is long enough to contain the printed circuit board 18, light guide 12, and lens 22.

The housing 20 may be manufactured in any suitable fashion and material, such as molding it of a plastic polycarbonate material with a 30% glass fiber fill. The housing 20 is preferably opaque and black to help prevent stray light from reaching the optical detector 14, and is rigid enough to hold the elements of the contact image sensor 10 in alignment.

A printed circuit board 18 is mounted between the sides 44 and 46 of the U-shaped housing 20. In a preferred embodiment, the printed circuit board 18 is positioned parallel to the contact surface 48 and is attached to the housing 20 with "push-nuts," part number 8063-08000551, available from the West Coast Lockwasher company. Plastic posts on the housing 20 pass through holes in the printed circuit board 18, and push-nuts are placed over the ends of the plastic posts to hold the printed circuit board 18 in position against the housing 20. The push-nuts are cone washers with a star shape inside. Once they have been pressed over the plastic posts, the star shape engages with the post to prevent removal of the push-nut. Alternatively, the printed circuit board 18 may be attached to the housing 20 using plastic heat stakes.

The printed circuit board 18, as best seen in FIG. 3, is a standard insulating substrate having electrical conductors placed thereon or embedded therein. Integrated circuits and other electrical devices are physically and electrically connected to the printed circuit board 18. In particular, the printed circuit board 18 holds the optical detector 14, the illumination source 16, two navigators 24 and 36, and other electrical devices and image processing circuits 54. The printed circuit board 18 has a width 56 of about 15.0 mm and a length 58 of about 123.0 mm.

The contact image sensor 10 with a light guide 12 also comprises an optical detector 14 for converting image light into electrical signals. The optical detector 14 preferably comprises a linear array of CMOS photodetectors (e.g., 60 and 62), such as type TSL1301, available from Texas Advanced Optoelectronic Solutions, Inc., of Plano, Tex. These CMOS photodetectors consist of 102 photodiodes, also arranged in a linear array. Light incident on a photodiode generates a current, which is integrated by the active integration circuitry associated with that pixel. During the integration period, a sampling capacitor connects to the output of the integrator through an analog switch. The amount of charge accumulated at each pixel is directly proportional to the light intensity and the integration time.

The optical detector 14 may alternatively comprise any of a wide variety of detector systems now known or that may be developed in the future that are suitable for producing image data relating to image light reflected by the object 24 being scanned. Consequently, the present invention should not be regarded as limited to any particular type of optical detector.

The CMOS photodetectors (e.g., 60 and 62) in the optical detector 14 are arranged end to end as closely as possible to form an unbroken line of CMOS photodetectors. In one preferred embodiment, the optical detector 14 includes fourteen CMOS photodetectors (e.g., 60 and 62). The optical detector 14 is connected to the printed circuit board 18 by a set of wirebond connections 64, which are coated in an encapsulant 66 for protection.

The optical detector 14 is oriented so that the wirebonds 64 and encapsulant 66 are on the side nearest the illumination source 16. As a result, the encapsulant 66 forms an opaque barrier between the optical detector 14 and the illumination source 16. The encapsulant 66 is deposited thickly enough that it extends substantially beyond the surface of the optical detector 14. For example, the encapsulant 66 may extend a distance 68 of about 1.5 mm beyond the surface of the printed circuit board 18 (or about 1.1 mm above the surface of the optical detector 14). As will be discussed in further detail hereinafter, the light guide 12 is positioned very close to the printed circuit board 18. The encapsulant 66 and light guide 12 thus form a baffle, preventing any stray light from the illumination source 16 from reaching the optical detector 14.

The encapsulant 66 may comprise any material which can flow over and around the wirebonds 64 and subsequently harden to a rigid state. In the preferred embodiment, the encapsulant 66 comprises HYSOL FP4652 low stress encapsulant and HYSOL CNB 798-2 flow control dam, available from the Dexter Corporation of Industry, Calif. The flow control dam is used to create a dam around the wirebonds, which is then filled in with the less viscous low stress encapsulant.

The contact image sensor 10 with a light guide 12 also comprises a lens 22 which is positioned under the optical detector 14. The lens 22 directs and focuses image light reflected from the scan line 32 onto the optical detector 14. In a contact image sensor 10, the lens 22 has a power or magnification factor substantially equal to 1.0. The lens 22 preferably comprises a rod lens array, or gradient index lens. A gradient index (GRIN) lens comprises a linear array of glass or plastic cylinders mounted side by side in a single housing. Each cylinder directs light by refraction due to a refractive index which smoothly varies from the center of the cylinder out to the edges. In a preferred embodiment, the lens 22 may comprise a GRIN lens such as the type sold under the name SELFOC which is a registered trademark of the Nippon Sheet Glass Company, Limited, part number SLA-20DF, having a height 70 of about 4.3 mm and a width 72 of about 125.8 mm. Each rod has a diameter of about 0.6 mm. The lens 22 is adhesively mounted to the rear portion of the housing 20 at a distance 74 of about 2.5 mm below the optical detector 14 and a height 80 of about 3.1 mm above the object 24.

The contact image sensor 10 with a light guide 12 also comprises an illumination source 16. The illumination source 16 produces a plurality of light rays which illuminate the scan region 28 on the object 24 through the window 23 in the housing contact surface 48. The illumination source 16 may comprise any of a wide range of light sources suitable for providing a plurality of light rays. By way of example, in one preferred embodiment, the illumination source 16 comprises a plurality of light emitting diodes (LEDs) (e.g., 38 and 40) which are surface mount soldered in spaced-apart relation onto the printed circuit board 18. Each light emitting diode (e.g., 38 and 40) may comprise an LED part number HSMA-S690, available from Hewlett-Packard Company of Palo Alto, Calif. The illumination source 16 preferably includes twelve LED's (e.g., 38 and 40), leaving gaps (e.g., 42) between them. The LED's (e.g., 38 and 40) are spaced approximately evenly across the printed circuit board 18, but some shifting of the LED's (e.g., 38 and 40) can improve the uniformity of the illumination across the scan line 32. The LED's (e.g., 38 and 40) in one preferred embodiment are spaced at a distance 78 of about 11.0 mm from each other. The illumination source 16 is connected to the printed circuit board 18 at a distance 76 from the optical detector 14 of about 4.0 mm.

If contact image sensor 10 with a light guide 12 is narrower than the target objects (e.g., 24), the contact image sensor 10 may also comprise one or more position detectors or navigators (e.g., 34 and 36) which are mounted to the printed circuit board 18 and housing 20. Each navigator comprises a photodetector wirebonded to the printed circuit board 18, with the wirebonds coated in an encapsulant. A lens (not shown) is positioned under each photodetector, and a navigator LED (not shown) is mounted to the housing 20 to illuminate portions of the document 24 through windows in the housing contact surface 48. The navigator LED's are oriented so that they illuminate the object 24 at a grazing angle. Reflected navigator image light travels through the navigator lens toward the navigator photodetectors, which convert the navigator image light into image data. The image data can then be used by a stitching algorithm to form a complete image of the object 24.

The light guide 12 is mounted in the contact image sensor 10 under the illumination source 16 so that light paths (e.g., 26 and 26') from the illumination source 16 are directed toward the scan region 28 under the optical detector 14 and lens 22. In one preferred embodiment, the light guide 12 comprises an inner panel 80 and an outer panel 82, placed in spaced apart relation under the illumination source 16 and adjacent the lens 22. The opposing surfaces of the inner and outer panels 80 and 82 form a reflective channel through which the illumination light paths (e.g., 26 and 26') travel. The light guide 12 preferably comprises sheets of reflective aluminum which is sized and shaped in a stamping operation. For example, the light guide 12 may be stamped of ULTRABRITE, EVERBRITE, or COILZAK aluminum, available from the Alcoa company of Pittsburgh, Pa., preferably having a thickness of about 0.4 mm.

Alternatively, the light guide 12 may comprise molded plastic members which are either naturally reflective or which are coated with a reflective material. The light guide 12 may also comprise other reflective materials such as MYLAR with rigid support members as needed.

The inner panel 80, best seen in FIGS. 4 and 5, is a polished elongate reflector having a reflectivity of at least about 70% (although a light guide having a lower reflectivity will still improve uniformity of illumination to some degree). The inner panel 80 has a length 110 of about 125.6 mm, extending between the sides 44 and 46 of the housing 20. The inner panel 80 is folded into three portions, an upper portion 84, a middle portion 86, and a lower portion 88. The upper portion is substantially vertical and has a height 90 of about 0.8 mm. The middle portion 86 is folded back toward the lens 22 at an angle 92 of about 135 degrees. The middle portion 86 has a height 94 of about 2.4 mm. The lower portion is folded forward from the middle portion 86 at an angle 96 of about 135 degrees. The portions 84, 86, and 88 of the inner panel 80 are flat between the ends 100 and 102 to parallel the scan line 32. The inner panel 80 is mounted to a side 104 of the lens 22 using an adhesive layer. Alternatively, the inner panel 80 may be mounted between the ends 44 and 46 of the housing 20.

The outer panel 82, best seen in FIGS. 6 and 7, is also a polished elongate reflector having a reflectivity of at least about 70%. The outer panel 82 has a length 112 of about 125.6 mm, extending between the sides 44 and of the housing 20 and coextensive with the inner panel 80. The outer panel 82 is folded into two portions, an upper portion 106 and a lower portion 108. The upper portion 106 is substantially vertical and has a height 116 of about 3.3 mm. The lower portion 108 is folded back away from the upper portion 106 toward the inner panel 80 at an angle 118 of about 156 degrees. The lower portion 108 has a height 120 of about 4.7 mm.

The light guide 12 also comprises a pair of spacer members extending between the inner panel 80 and outer panel 82 near their ends. In the preferred embodiment, the outer panel 82 comprises a left spacer 122 extending from the left side 124 or end. The outer panel 82 also comprises a right spacer (not shown) which is a mirror image of the left spacer 122 and which extends from the right side 126 of the outer panel 82.

The spacers (e.g., 122) extend between the inner panel 80 and outer panel 82 to help in correct spacing and relative orientation of the panels 80 and 82. The spacers (e.g., 122) are also reflective, contributing to the efficient use of the illumination from the illumination source 16.

Referring now to FIG. 6, the left spacer 122 is integral with the lower portion 108 of the outer panel 82. The left spacer 122 is folded back from the lower portion 108 at a right angle, so that the plane containing the left spacer 122 is perpendicular to the planes containing the lower portion 108 and the upper portion 106. The left spacer 122 has a height 128 of about 4.7 mm and a width 130 of about 3.0 mm. The left spacer 122 has an inner side 134 which is placed adjacent the inner panel 80 and an outer side 136 which lies adjacent the upper portion 106 of the outer panel 82 when folded. The left spacer 122 has a mainly rectangular form which is upright so that the outer side 136 is parallel to the upper portion 106 of the outer panel 82.

The top 138 of the left spacer 122 is located at a distance 132 of about 2.2 mm below the top 140 of the outer panel 82. The inner side 134 of the left spacer 122 thus lies flat against the lower portion 88 of the inner panel 80. Alternatively, the left spacer 122 may be extended to the top 140 of the light guide 12, but must then have a more complicated shape to lie flat against the lower portion 88, middle portion 86, and upper portion 84 of the inner panel 80. The bottom 142 of the left spacer 122 extends near or to the bottom 144 of the outer panel 82.

Alternatively, the left spacer 122 may be integral with the upper portion 106 of the outer panel 82, or with any portion 84, 86, or 88 of the inner panel 80. The left spacer 122 may also be a separate element which is mounted to the inner panel 80, outer panel 82, or housing 20, or may simply be a reflective or non-reflective region molded into the housing 20.

The detailed description left spacer 122 applies also to the mirror image right spacer (not shown).

The upper portions 90 and 106 of the inner and outer panels 80 and 82, respectively, flank the illumination source 16 and are spaced at a distance 114 of about 1.5 mm. The light guide 12 is aligned so that the illumination source 16 is roughly centered between the inner panel 80 and the outer panel 82. The upper portions 90 and 106 of the inner and outer panels 80 and 82 preferably extend near enough to the printed circuit board 18 to form a baffle with the encapsulant 66 and to prevent stray light from escaping over the top of the light guide 12.

It is important to note that the configuration of the light guide 12 as defined by the portion heights (e.g., 90 and 116) and angles (e.g., 92 and 118) is not necessarily optimized for best focusing and directing of light from the illumination source 16. Rather, the configuration of the light guide 12 is designed to be as close as possible to the optimum while following the constraints of the contact image sensor 10. Alternatively, the light guide 12 may be optimized using a computer program for optical design such as ASAP 5.0, available from Breault Research Organization, Inc. of Tucson, Ariz., with the contact image sensor 10 adapted to the optimized light guide 12.

During operation of the contact image sensor 10 with a light guide 12, the illumination source 16 produces rays which follow a variety of light paths (e.g., 26 and 27) into the light guide 12. The light paths (e.g., 26 and 27) reflect from the walls or panels 80 and 82 of the light guide 12 and follow reflected light paths (e.g., 26', 27', and 27") out of the light guide 12 and contact image sensor 10 to the scan region 28 on the object 24. Image light is reflected from the object 24 and travels along a light path 30 into the lens 22. The image light then follows a light path 30' through the lens 22 to the optical detector 14. The optical detector 14 then produces electrical signals representative of the image light.

Figure 8:
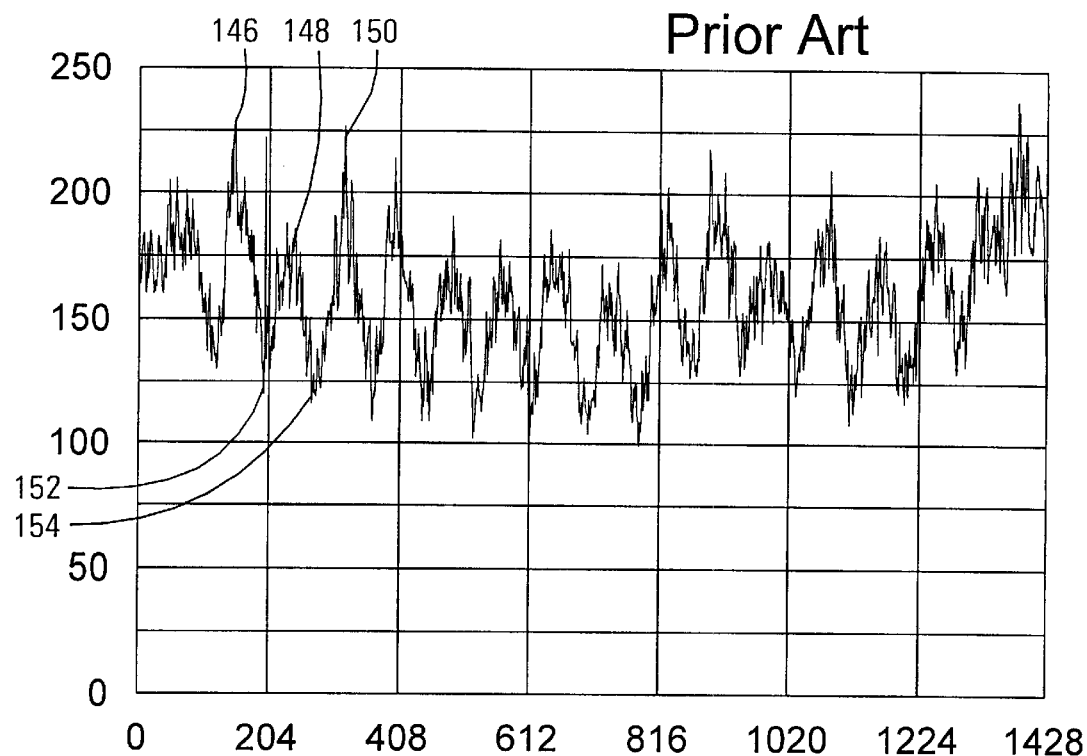
FIG. 8 is a graph illustrating the non-uniformity of illumination across a scan line in a prior art contact image sensor.
Figure 9:
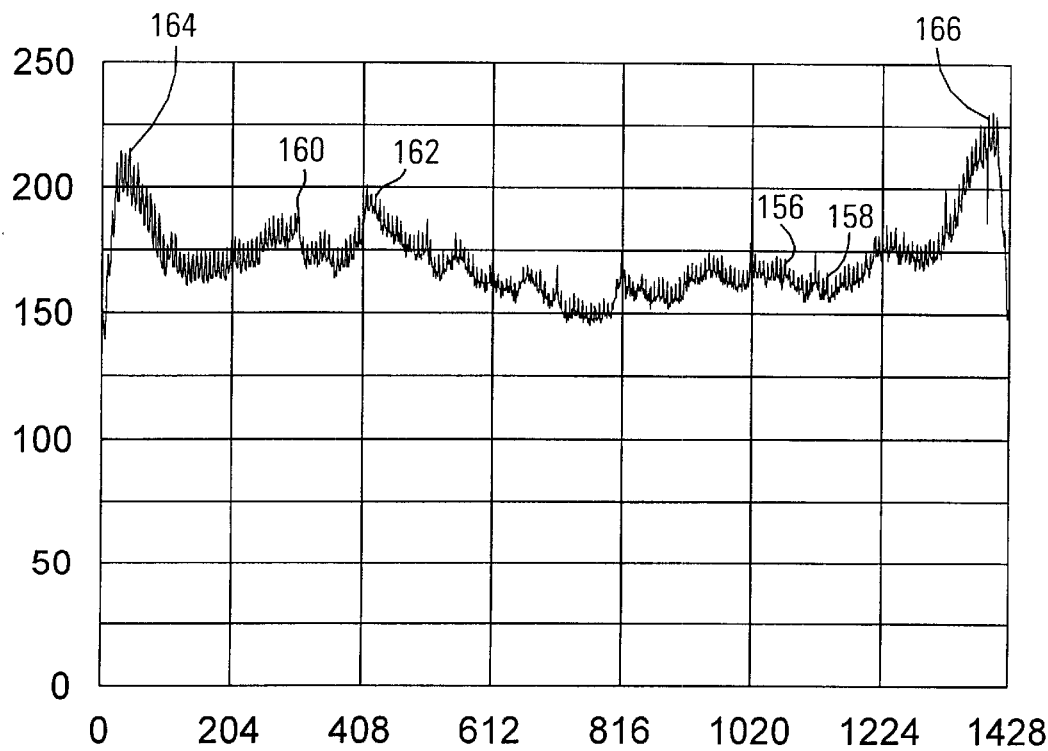
FIG. 9 is a graph illustrating the uniformity of illumination across a scan line in the contact image sensor with a light guide of FIG. 1.

Referring now to FIGS. 8 and 9, graphical representations of the uniformity of scan line illumination in a contact image sensor with and without a light guide 12 will be discussed. Each figure shows a plot of light intensity as measured by an 8-bit digitizer, which scales the light intensity from 0 to 255. The Y axis thus corresponds to light intensity, while the X axis corresponds to the scan line on a uniform object 24 as detected by the 1428 pixels across the optical detector 14. (Please note that the Y axes of the plots in FIGS. 8 and 9 are scaled from 0 to 250, thus do not show the entire 8-bit digitizer range of 0 to 255.)

The intensity of illumination across a scan line in a contact image sensor without a light guide 12 varies greatly, as shown in FIG. 8. In this contact image sensor, eighteen LEDs are spaced across a circuit board and placed near the scan line 32 at an angle. The series of peaks (e.g., 146, 148, and 150) in the graph of FIG. 8 correspond to bright spots on the scan line 32 under the LEDs. The series of valleys (e.g., 152 and 154) in the graph of FIG. 8 correspond to dark spots on the scan line 32 under the gaps between the LEDs. These peaks and valleys (e.g., 146 and 152) result in uneven scanned images which have bright streaks and dark streaks. These peaks and valleys (e.g., 146 and 152) can be compensated for somewhat by postprocessing software. However, postprocessing software slows down the scanning process and is not entirely effective. The peaks and valleys (e.g., 146 and 152) also complicate the design process, as it is unclear from the graph of FIG. 8 how the spacing between each of the LEDs can be adjusted to increase uniformity.

In contrast, the contact image sensor 10 with a light guide 12 provides much more uniform illumination across the scan line 32, as illustrated in FIG. 9. The spotlight effect causing the peaks and valleys (e.g., 146 and 152) in FIG. 8 is greatly reduced. (The small spikes (e.g., 156 and 158) correspond to each tube or cylinder in the GRIN lens 22 which transmits image light to the optical detector 14.)

The uniform illumination provided by the light guide 12 in the contact image sensor 10 also aids in design of the illumination source 16. With the peaks and valleys (e.g., 146 and 152) of FIG. 8 reduced, it is much simpler to adjust spacing between the LEDs (e.g., 38 and 40) to flatten the graph of FIG. 9 even further. For example, it is clear that increasing the spacing of some LED's (e.g., 38 and 40) could lower the small remaining hills (e.g., 160 and 162) without deepening valleys. It is also clear that the LED's at the ends of the printed circuit board 18 could also be spaced further apart to eliminate the hills 164 and 166 caused by the reflective spacers (e.g., 122). This illustrates the efficient use of light from the illumination source 16 due to the light guide 12. (Some non-uniformity of illumination is of course expected due to normal variations in the operating characteristics of the parts of the contact image sensor 10.)

The uniformity of illumination provided by the light guide 12 may also be improved by selectively altering the reflectivity of the light guide 12. For example, the reflectivity of the light guide 12 can be reduced in areas just under each LED (e.g., 38 and 40), to prevent peaks in intensity under them. This may be accomplished either by applying a less reflective coating, or by texturing the surface of the light guide 12. In one embodiment, rectangles of lower reflectivity being approximately 2 mm wide and 3 mm tall are positioned on the opposing surfaces of the inner and outer panels 80 and 82 just under each LED (e.g., 38 and 40).

Figure 10:
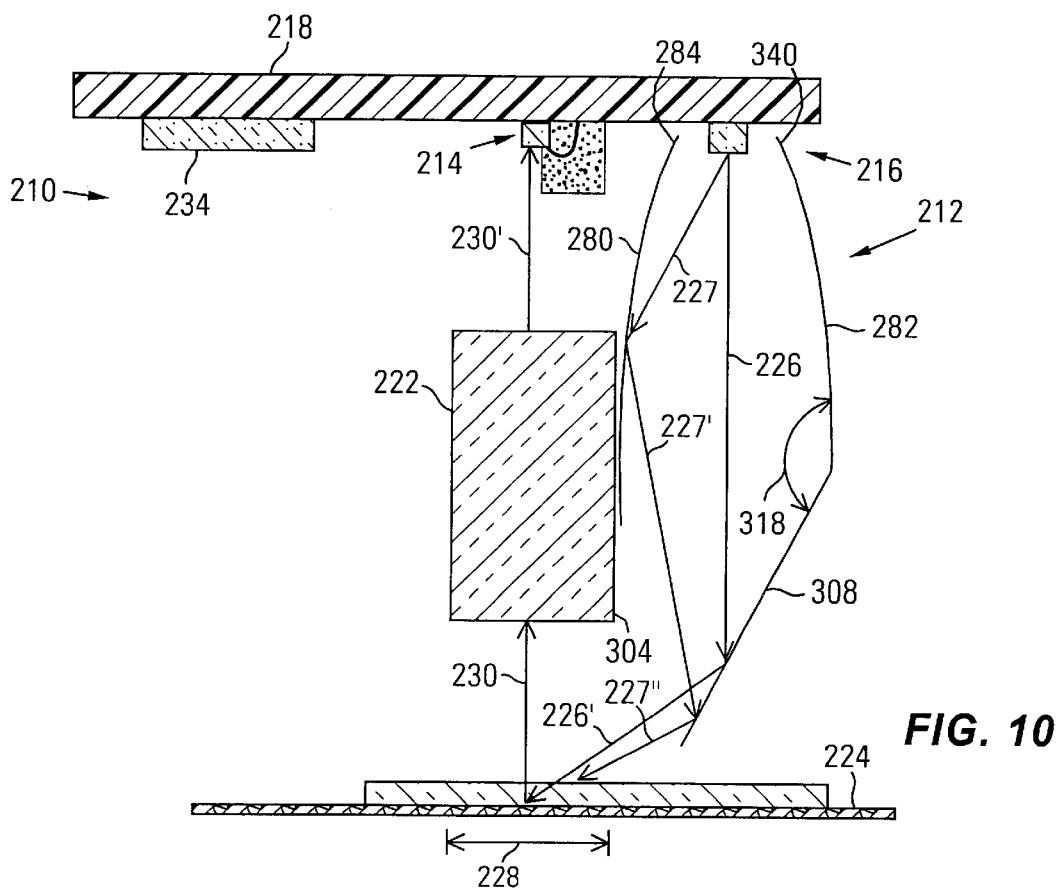
FIG. 10 is a side view of a contact image sensor with an elliptical light guide.

Referring now to FIG. 10, another embodiment of a contact image sensor 210 may comprise an elliptical light guide 212. As with the contact image sensor 10 discussed above, the contact image sensor 210 with an elliptical light guide 212 comprises an optical detector 214 and a illumination source 216 mounted to a printed circuit board 218. A lens 222 is mounted to a housing (not shown) under the optical detector 214, and a navigator 234 may also be mounted to the printed circuit board 218.

The elliptical light guide 212 comprises a curved inner panel 280 and a curved outer panel 282 placed in spaced apart relation with opposing concave surfaces. The curved inner panel 280 is adhesively mounted to the side 304 of the lens 222, or may be mounted to the housing, while the curved outer panel 282 is mounted to the housing as described above.

The tops 284 and 340 of the curved inner panel 280 and curved outer panel 282, respectively, flank the illumination source 216 and are placed as near as possible to the printed circuit board 218. A planar reflector 308 is integrally formed with the curved outer panel 282 at a lower end, and is folded in toward the lens 222 at an angle 318 of about 157.5 degrees.

The parameters of the parabola are dependent upon the dimensions and configuration of the contact image sensor 210. Furthermore, the curved inner panel 280 and curved outer panel 282 need not be strictly elliptical. As discussed above, the elliptical light guide 212 may be modified away from the optimum light transmission shape to follow the constraints of the contact image sensor 210. However, in the preferred elliptical light guide 212 the foci are located at the illumination source 216 and the scan region 228.

During operation of the contact image sensor 210 with an elliptical light guide 212, the illumination source 216 produces rays which follow a variety of light paths (e.g., 226 and 227) into the elliptical light guide 212. The light paths (e.g., 226 and 227) reflect from the curved panels 280 and 282 of the elliptical light guide 212 and follow reflected light paths (e.g., 226', 227', and 227") out of the elliptical light guide 212 and contact image sensor 210 to a scan region 228 under the lens 222. Image light is reflected from the object 224 and travels along a light path 230 into the lens 222. The image light then follows a light path 230' through the lens 222 to the optical detector 214. The optical detector 214 then produces electrical signals representative of the image light.

Figure 11:
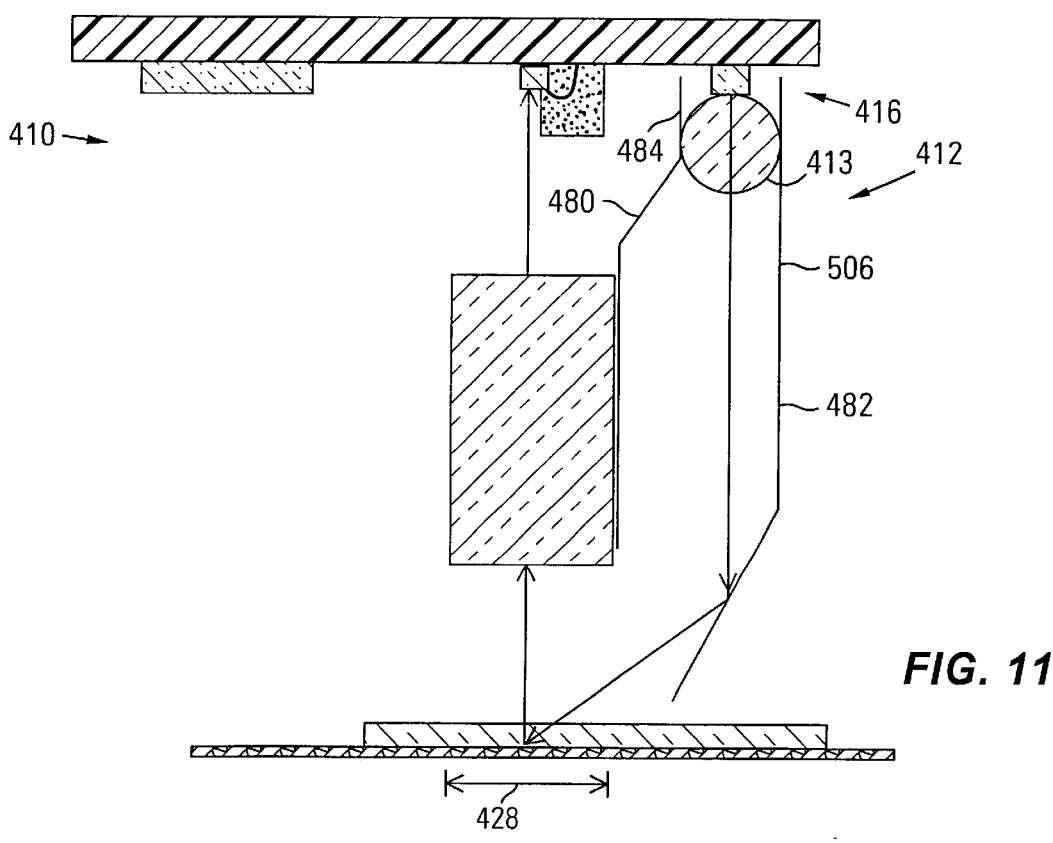
FIG. 11 is a side view of a contact image sensor with a light guide having a cylindrical lens adjacent the illumination source.

In another embodiment, illustrated in FIG. 11, a contact image sensor 410 with a light guide 412 is configured identically to the contact image sensor 10 with a light guide 12 shown in FIGS. 1–3 and described above, except that a lens 413 is mounted between the upper portions 484 and 506 of the inner and outer panels 480 and 482, respectively. The lens 413 is a cylindrical lens sized to fit snugly between the inner and outer panels 480 and 482 and between the ends of the housing (not shown). The cylindrical lens 413 is located very close to or in contact with the illumination source 416. The cylindrical lens 413 enhances the operation of the light guide 412 by focusing light rays into the light guide 412 and increasing the focal power of the light guide 412. Light rays which would otherwise enter the light guide 412 at large angles would internally reflect many times inside the light guide 412, losing intensity. The light rays may also exit the light guide 412 at undesirably large angles and fail to reach the scan region 428.

Figure 12:
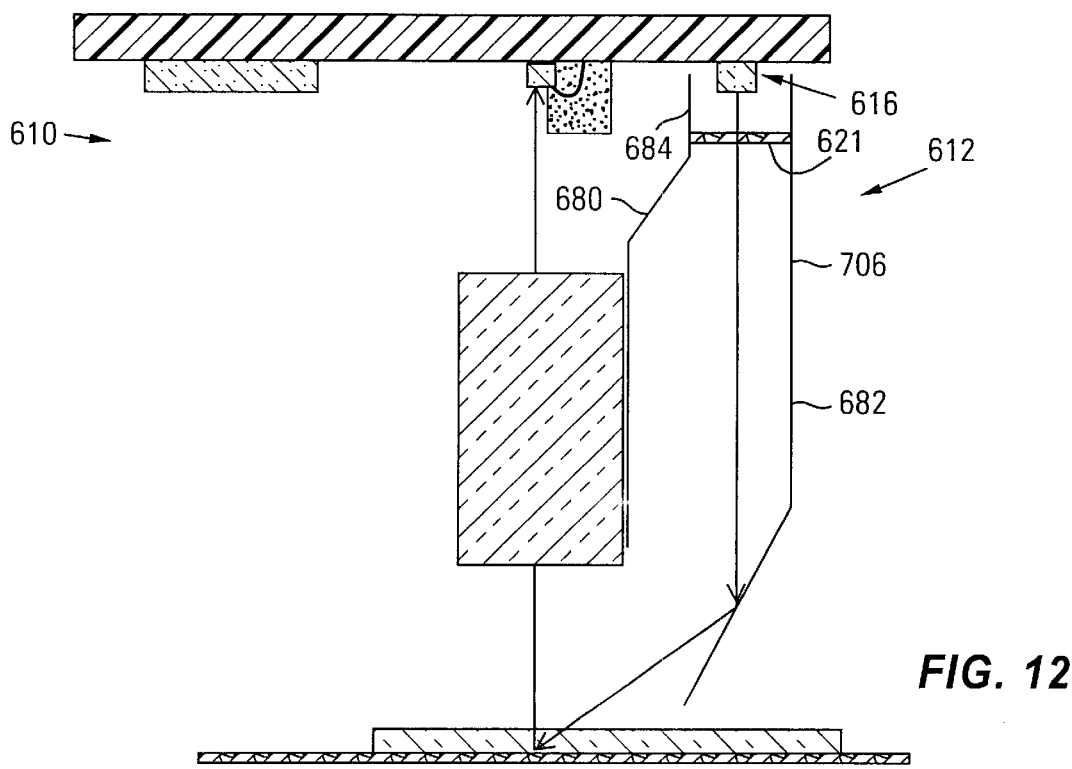
FIG. 12 is a side view of a contact image sensor with a light guide having a diffusing sheet adjacent the illumination source.

In another embodiment, illustrated in FIG. 12, a contact image sensor 610 with a light guide 612 is configured identically to the contact image sensor 10 with a light guide 12 shown in FIGS. 1–3 and described above, except that a diffusing sheet 621 is mounted between the upper portions 684 and 706 of the inner and outer panels 680 and 682, respectively. The diffusing sheet 621 is a substantially transparent sheet which sized to fit snugly between the inner and outer panels 680 and 682 and between the ends of the housing (not shown). The diffusing sheet 612 allows substantially all of the light from the illumination source 616 to pass into the light guide 612. However, the light is scattered as it passes through the sheet 612, increasing the uniformity of illumination across the scan line. The diffusing sheet 612 may comprise part number DFA-20, available from the 3M company of Minneapolis, Minn. The diffusing sheet 612 may be adhesively mounted to the upper portions 684 and 706 of the inner and outer panels 680 and 682, or may be mounted to the housing.

Figure 13:
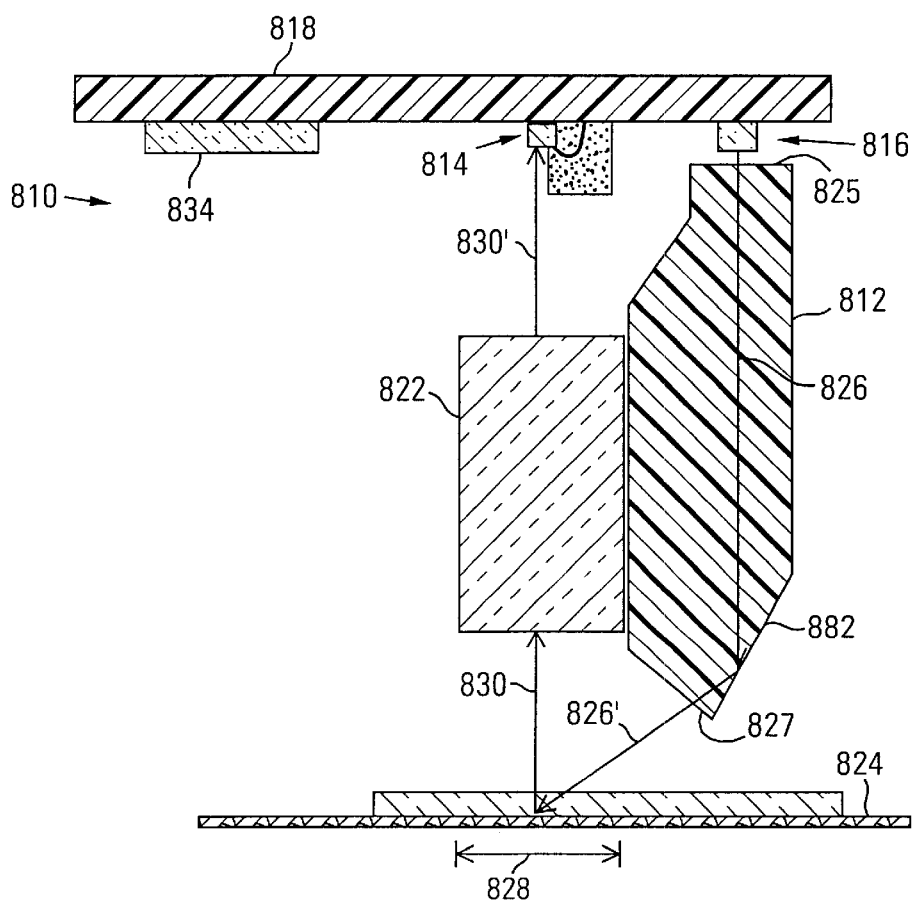
FIG. 13 is a side view of a contact image sensor with a solid light pipe.

Referring now to FIG. 13, another embodiment of a contact image sensor 810 may comprise a solid light pipe 812. As with the contact image sensor 10 discussed above, the contact image sensor 810 with a solid light pipe 812 comprises an optical detector 814 and a illumination source 816 mounted to a printed circuit board 818. A lens 822 is mounted to a housing (not shown) under the optical detector 814, and a navigator 834 may also be mounted to the printed circuit board 818.

The solid light pipe 812 may be made from any substantially transparent material having an index of refraction greater than that of air. As a result of the index of refraction, light rays may pass into and out of the solid light pipe 812 only when the rays are at near normal angles with respect to the sides of the light pipe 812. Any light rays striking the sides of the solid light pipe 812 with angles of incidence greater than the critical angle of incidence for the light pipe material will be internally reflected, as seen in light path 826. The top 825 of the solid light pipe 812, which is located below the illumination source 816, is thus preferably parallel to the illumination source 816. Similarly, the bottom 827 of the solid light pipe 812 is perpendicular to the preferred direction of illumination of the scan region 828, such as along the illustrated reflected light path 826'.

Stray light baffles or reflectors may be placed alongside the illumination source 816 to direct the light rays into the solid light pipe 812. Alternatively, an illumination source 816 may be selected which radiates primarily straight down into the solid light pipe 812.

The top 825 of the solid light pipe 812 may be slightly textured if desired to diffuse the light from the illumination source 816 as it enters the light pipe 812. The solid light pipe 812 may be shaped with the same dimensions as in the various embodiments discussed above.

During operation of the contact image sensor 810 with a solid light pipe 812, the illumination source 816 produces rays which follow a variety of light paths (e.g., 826) into the solid light pipe 812. The light paths (e.g., 826) internally reflect from the sides (e.g., 882) of the solid light pipe 812 and follow reflected light paths (e.g., 826') out of the solid light pipe 812 and contact image sensor 810 to a scan region 828 under the lens 822. Image light is reflected from the object 824 and travels along a light path 830 into the lens 822. The image light then follows a light path 830' through the lens 822 to the optical detector 814. The optical detector 814 then produces electrical signals representative of the image light.

While illustrative and presently preferred embodiments of the invention have been described in detail herein, it is to be understood that the inventive concepts may be otherwise variously embodied and employed. For example, the light guide 12 may be shaped in many alternate fashions to accommodate various configurations of contact image sensor. The appended claims are intended to be construed to include such variations, except as limited by the prior art.

What is claimed is:

1. A contact image sensor, comprising:

at least one light source; and a light guide located under said at least one light source, said light guide having varied reflectivity levels, wherein said light guide is least reflective adjacent said at least one light source.

2. The contact image sensor of claim 1, further comprising:

a mounting surface, said at least one light source being mounted to said mounting surface to direct a light path from said light source to a scan line region;

an optical detector mounted to said mounting surface; and a lens located under said light sensitive optical detector so that a reflected light path extending between said scan line region and said optical detector passes through said lens.

3. The contact image sensor of claim 2, wherein said lens comprises a gradient index lens.

4. The contact image sensor of claim 2, wherein said mounting surface comprises a printed circuit board.

5. The contact image sensor of claim 1, wherein said at least one light source comprises a plurality of light emitting diodes.

6. The contact image sensor of claim 2, wherein said light guide comprises a light pipe having a top end, a bottom end, a front side and a back side, said top end being located adjacent said light source and said bottom end being located adjacent said scan line region so that said light path may pass through said top end and said bottom end of said light pipe and said light path internally reflects off said front side and said back side.

7. The contact image sensor of claim 2, wherein said light guide comprises an inner panel and an outer panel, said inner panel placed adjacent said outer panel in spaced apart relation so that said light path may pass between said inner panel and said outer panel.

8. The contact image sensor of claim 7, wherein said inner panel and said outer panel each comprise a first end and a second end, said light guide further comprising a first spacer member and a second spacer member, said first spacer member extending between said first end of said inner panel and said first end of said outer panel, said second spacer member extending between said second end of said inner panel and said second end of said outer panel.

9. The contact image sensor of claim 8, further comprising a lens located under said light sensitive optical detector, wherein said inner panel is attached to said lens.

10. The contact image sensor of claim 9, further comprising a housing, said mounting surface and said lens and said outer panel being connected to said housing.

11. The contact image sensor of claim 7, wherein said outer panel comprises an upper portion and a lower portion, said upper portion connected to said lower portion at an angle between about 135 degrees and about 155 degrees.

12. The contact image sensor of claim 7, wherein said inner panel and said outer panel comprise curved members.

13. The contact image sensor of claim 1, wherein said light guide is made of aluminum.

14. The contact image sensor of claim 1, wherein said light guide is made of molded plastic with a reflective coating.

15. The contact image sensor of claim 1, wherein said light guide is made of sheet plastic with a reflective coating.

16. The contact image sensor of claim 1, further comprising a cylindrical lens in said light guide under said light source.

17. The contact image sensor of claim 1, further comprising a diffusing sheet in said light guide under said light source.

18. A method of producing a contact image sensor, comprising:

mounting at least one light source in said contact image sensor; and positioning a light guide adjacent said at least one light source, said light guide having at least two portions with different levels of reflectivity, wherein said light guide is positioned so that a least reflective portion of said light guide is closest to said at least one light source.

19. A contact image sensor, comprising:

a plurality of light sources mounted to a printed circuit board; and means for directing light from said plurality of light sources to a region under a plurality of photodetectors, wherein said means for directing light is least reflective adjacent each of said plurality of light sources and most reflective between each of said plurality of light sources.

* * * * *